United States Patent

[11] 3,622,772

[72] Inventors Kazuhiro Koiso
Osaka;
Tadato Ozima, Hirakata-shi; Hanji Takahashi, Suita-shi; Soji Takada, Hirakata-shi; Akira Asai, Hirakata-shi; Toru Kokuwa, Neyagawa-shi, all of Japan
[21] Appl. No. 780,453
[22] Filed Dec. 2, 1968
[45] Patented Nov. 23, 1971
[73] Assignee Matsushita Electric Industrial Co., Ltd. Osaka, Japan
[32] Priority Dec. 8, 1967
[33] Japan
[31] 43/103873

[54] DIAL DEVICE
7 Claims, 11 Drawing Figs.
[52] U.S. Cl................................................ 240/2.1, 116/124.1 R, 116/135
[51] Int. Cl..................................................... G01d13/06, G01d 11/28

[50] Field of Search............................................ 240/2.1, 9, 152; 334/86; 116/124.1, 124.4, 135

[56] References Cited
UNITED STATES PATENTS

| 3,139,854 | 7/1964 | Hedges et al. | 116/135 |
| 2,154,406 | 4/1939 | Marholz | 116/124.4 X |
| 2,502,832 | 4/1950 | Dockendorff | 116/124.1 X |
| 2,804,041 | 8/1957 | Neugass | 116/124.4 X |
| 2,569,579 | 10/1951 | Rinker | 353/41 |
| 2,130,153 | 9/1938 | Plensler | 334/86 X |
| 3,465,708 | 9/1969 | Lintz et al. | 334/86 X |
| 2,367,577 | 1/1945 | Hayward | 240/2.1 |

Primary Examiner—Samuel S. Matthews
Assistant Examiner—Russell E. Adams, Jr.
Attorney—Stevens, Davis, Miller & Mosher ABSTRACT: A dial device for radio receivers and other communication apparatus, which is simplified in construction, employing a band indicator plate which eclipses a display window in direct proportion to the dial adjustment, thereby producing a clear indication of the dial setting.

PATENTED NOV 23 1971 3,622,772

INVENTORS
KAZUHIRO KOISO, TADATO OZIMA,
HANJI TAKAHASHI, SOJI TAKADA
AKIRA ASAI, TORU KOKUWA

BY Stevens, Davis, Miller & Mosher

ATTORNEYS

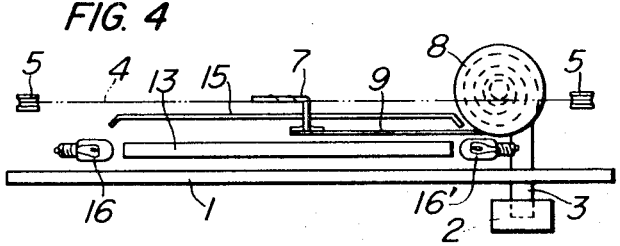
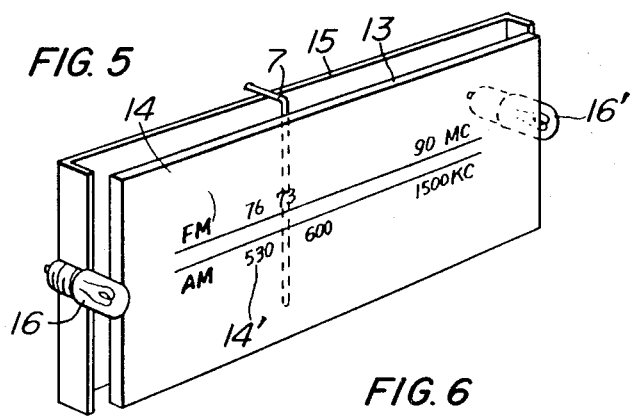
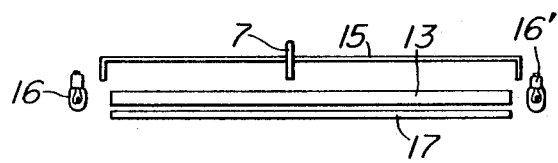
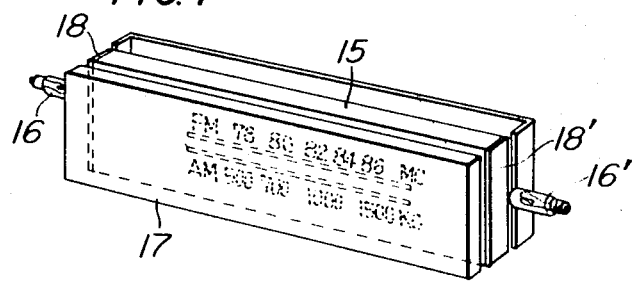
INVENTORS
KAZUHIRO KOISO, TADATO OZIMA
HANJI TAKAHASHI, SOJI TAKADA
AKIRA ASAI, TORU KOKUWA
BY Stevens, Davis, Miller & Mosher
ATTORNEYS INVENTORS
KAZUHIRO KOISO, TADATO OZIMA,
HANJI TAKAHASHI, SOJI TAKADA,
AKIRA ASAI, TORU KOKUWA BY Stevens, Davis, Miller & Mosher
ATTORNEYS

DIAL DEVICE

This invention relates to a dial device for radio receivers or other communication apparatus.

The conventional dial devices commonly in use are disadvantageous in that the indication cannot be clearly observed from a remote place because of the spot or pointer indication type. In order to eliminate such disadvantage, there has been proposed and employed an arrangement wherein a slant band is drawn on a cylindrical drum in such a manner as to be able to be observed through a slit which is formed coaxially with respect to the drum. However, such arrangement is not satisfactory because the indication is effected by way of an oblique border line since the band per se is oblique as described above.

In accordance with the present invention, a clear indication can be produced by way of a vertical border line, thus eliminating the aforementioned drawbacks.

It is an object of the present invention to provide a dial device which is simplified in construction and adapted to represent the amount of indication as an entire display window and not by way of a dot or a line, thereby remarkably increasing the visual appeal.

Another object of the present invention is to provide a dial device adapted to represent the amount of indication as an entire display window, wherein remarkable contrast is imparted to the indication characters and numerals between when the apparatus is in use and when it is not in use, that is, between when a pilot lamp for illuminating a dial plate is lit and when it is not lit, thereby making it possible to clearly determine the status of the apparatus.

Still another object of the present invention is to provide a dial device wherein the dial plate is colored in colors which are in complementary relationship with each other, and said dial plate is illuminated by light rays which are in complementary relationship to said colors, thereby enabling only a desired portion of the dial plate to be distinctly observed.

In accordance with the present invention, the amount of indication is represented as an entire display window so that it can easily be determined even from a remote place. Furthermore, the indication is produced with colors so as to be more effective, thus making it possible to very definitely distinguish between when the apparatus is being used and when it is not being used.

Still furthermore, no complicated mechanism is employed, and therefore the dial device per se can be simplified in construction and miniaturized. This also constitutes an advantage in economy.

Other objects, features and advantages of the present invention will be readily apparent from the following detailed description of certain preferred embodiments taken in conjunction with the accompanying drawings, in which:

FIG. 4 is a top plan view showing a second embodiment of the present invention;

FIG. 5 is a perspective view showing the main portion thereof;

FIG. 6 shows a third embodiment of the present invention;

FIG. 7 shows a fourth embodiment of the present invention;

FIGS. a and b show a sixth embodiment of the present invention

Figure 1:
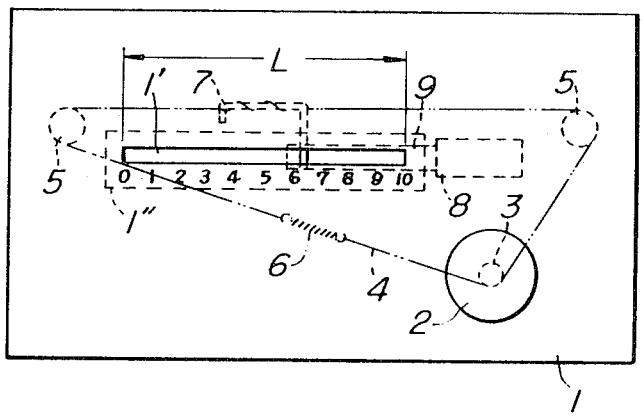
FIG. 1 is a front view showing the dial device according to an embodiment of the present invention.
Figure 2:
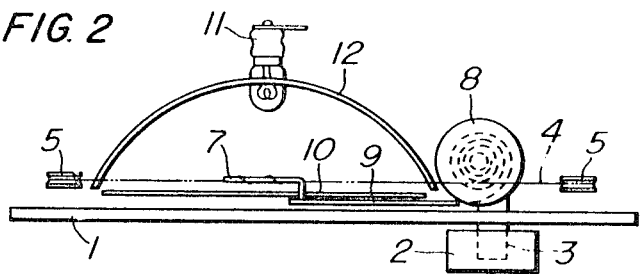
FIG. 2 is a top plan view thereof.
Figure 3:
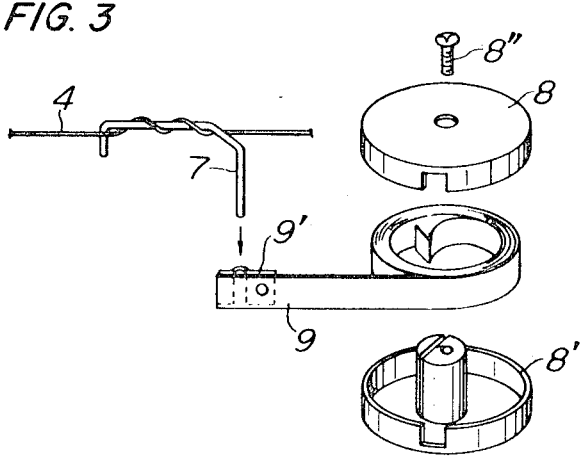
FIG. 3 is a perspective view showing the main portion of the device.

Referring to FIGS. 1 to 3, 1 represents a panel having a longitudinal window 1' formed in the center portion thereof and indication characters 1'' arranged along one of the longitudinal edges of the window. 3 denotes a shaft extending through the panel 1 and which has a knob 2 provided on the fore end thereof. 4 indicates a dial rope extending over the shaft 3 and rollers 5, and it includes a spring 6 adapted to absorb the expansion which tends to occur in the rope when the latter is driven. 7 denotes an indicator piece holding member which is provided at a position opposite to the window 1' of the panel 1. 8 and 8' represent a case for accommodating the indicator piece. The case is provided on the side of the display window 1'. 9 denotes a springlike indicating member which is accommodated in the case 8, 8' and the fore end of which is connected with the indicating member holding piece. 10 indicates a colored plate mounted in opposing relationship to the display window 1', 11 light source, and 12 a reflector plate.

In the arrangement shown in FIGS. 1 to 3, the rope 4 is driven a distance "L" rotating the knob 2, so that the indicating member holding piece 7 connected with the rope 4 is also driven correspondingly. Thus, the indicating member 9 is displaced due to its own spring pressure from the position "10" toward the position "0" of the indication characters 1''. Alternatively, it is displaced in the opposite direction or from the position "0" to the position "10" due to its inherent force tending to cause the indicating member per se to be pulled into the case 8. As a result, the amount of the colored plate 10 is increased or decreased depending upon the amount of rotation of the knob 2, and thus the latter can be determined directly by the former. With the arrangement of FIGS. 1 to 3, therefore, it is possible to make the border line completely vertical with respect to the display window so that the indicated amount can be represented as the entire display window. Thus, the indication can be made so clear that the amount of indication can be observed from a remote place.

FIGS. 4 and 5 show an arrangement similar to the dial device shown in FIGS. 1 to 3, except that a dial plate 13 is used in place of the colored plate 10, and it is illuminated from the sides.

In FIGS. 4 and 5, the elements indicated at 1 to 9 are similar to those of FIGS. 1 to 3. 13 represents a dial plate formed by a transparent material and having indication characters, numerals 14, 14' and so forth in a predetermined color indicated on the back surface thereof. 15 denotes a reflector plate of which the surface is colored in the same color as the indication characters 14, 14'. The reflector plate 15 is disposed in opposing relationship to the rear surface of the dial plate 13. 16 and 16' indicate pilot lamps which are lit by turning on a power source to illuminate the dial plate. These lamps are provided on the opposite sides of the dial plate.

In the arrangement shown in FIGS. 4 and 5, the indication characters cannot substantially be seen when the pilot lamps 16 and 16' are turned off, and only when the lamps are turned on, such characters are brightly lit up to be clearly seen, since the surface of the reflector plate 15 is colored in the same color as the indication characters 14, 14' and the dial plate 13 is illuminated from the opposite sides by the pilot lamps 16, 16'. Thus, with such type of dial device, it is not only possible to produce clear indication as with the dial device shown in FIGS. 1 to 3 but also to determine whether the apparatus is being used or not.

The arrangement shown in FIG. 6 is different from the device shown in FIGS. 4 and 5 in that there is provided a translucent colored plate 17, thereby making it possible to more definitely determine whether the apparatus thereby making being used or not.

FIG. 7 shows an arrangement improved over that of FIG. 6, wherein the indication characters 14 and 14' are indicated in different colors and color filters 18 and 18' are interposed between the dial plate 13 and the pilot lamps 16 and 16', respectively. With such arrangement, therefore, it is possible to display the indication characters 14, 14' and dial plate 13 in the predetermined colors, thus producing a colorful display.

Figure 8:
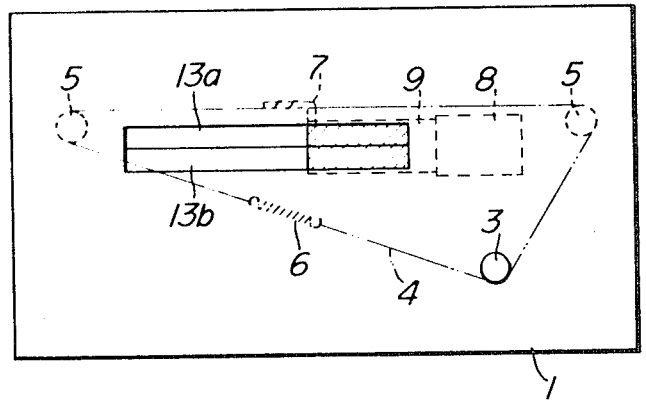
FIGS. 8 and 9 show a fifth embodiment of the present invention.
Figure 9:
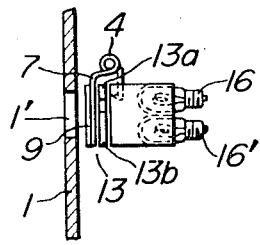

In the embodiment shown in FIGS. 8 and 9, the dial plate 13 per se is divided into upper and lower sections which are colored in complementary relationship to each other, and the light rays emanating from pilot lamps 16 are so switched as to be in complementary relationship to each other in accordance with the colors of said dial plate 13. That is, in FIGS. 8 to 10, 13a and 13b represent the dial plate sections colored in complementary relationship to each other, and 16a and 16b pilot lamps which radiate light rays complementary in color to the dial plate sections 13a and 13b respectively.

Assume that in FIGS. 8 and 9, the color of the dial plate section 13a and light from the pilot lamp 16a is red, and that the color of the dial plate section 13b and light from the pilot lamp 16b is green. Then, only the dial plate section 13a is lit up when the pilot lamp 16a is turned on, while when the pilot lamp 16b is turned on, only the dial plate section 13b is lit up. Thus, with such arrangement, it is possible not only to display the dial plate in color but also lightup one of the dial plate sections without providing separate light shielding plates for the light rays emanating from the pilot lamps 16a and 16b.

Figure 10A:
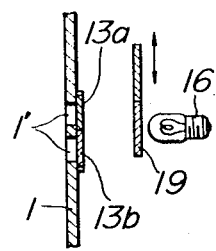
Figure 10B:
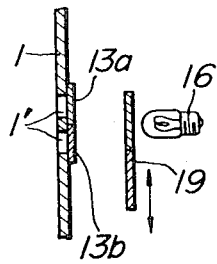

FIG. 10 shows an arrangement adapted to produce display in different colors by the use of a single pilot lamp, wherein a color filter 19 divided into upper and lower sections which are complementary in color with each other is provided in front of the pilot lamp 16. With such arrangement, it is possible to lightup one of the dial plate sections 13a and 13b by upwardly or downwardly displacing the color filter 19 as shown at A and B in FIG. 10.

What is claimed is:

1. A dial device comprising a panel having a display window, a dial plate parallel with said panel and located inside thereof, pilot lamps for illuminating the dial plate, a dial cord movably mounted on the device along the display window, a knob means mounted on the panel for moving the dial cord, a case mounted behind said panel and to the side of said display window, and indicator means in the form of flexible strip biased to coil up within said case, said indicator means being attached to said dial cord in such a way as to be visible through said display window and being moved into or out of said case in response to the movement of said dial cord.

2. A dial device according to claim 1, wherein said dial plate comprises upper and lower sections which are colors complementary to each other, and said pilot lamps have color filters which are of colors complementary to each other corresponding to said colors of the upper and lower sections of said dial plate.

3. A dial device according to claim 1, wherein said indicator means is in the form of a resilient strip where the strip's resilient property biases said strip in such a way as to coil up within said case.

4. A dial device according to claim 1 wherein said dial plate is formed of a transparent material, a reflector plate is provided in parallel with the rear surface of said dial plate of the same color as that of the characters on said dial plate, and a pilot lamp for illuminating said dial plate is provided sidewise of said dial plate.

5. A dial device according to claim 4, further including a translucent colored protector plate in front of said dial plate.

6. A dial device according to claim 5, further comprising a color filter interposed between said dial plate and said pilot lamp so that the dial plate per se is illuminated by color light rays.

7. A dial device comprising a panel having a display window, a dial plate parallel with said panel and located inside thereof, a pilot lamp for illuminating the dial plate, a dial cord movably mounted on the device along the display window, a knob means mounted on the panel for moving the dial cord, a case mounted behind said panel and to the side of said display window, indicator means in the form of a flexible strip biased to coil up within said case, said indicator means being attached to said dial cord in such a way as to be visible through said display window and being moved into or out of said case in response to the movement of said dial cord, said dial plate comprising upper and lower sections which are of colors complementary to each other, and a movable color filter located in front of said pilot lamp and comprising upper and lower sections which are of colors complementary to each other corresponding to said colors of the upper and lower sections of said dial plate.

* * * * *

UNITED STATES PATENT OFFICE
CERTIFICATE OF CORRECTION

Patent No. 3,622,772          Dated November 23, 1971

Inventor(s) Kazuhiro KOISO et al

It is certified that error appears in the above-identified patent and that said Letters Patent are hereby corrected as shown below:

In the Claim for Convention Priority, two of the three Japanese applications are omitted and should be included as follows:

--Japan, Pat. Appln. N° 137/68 filed December 28, 1967;
  Japan, Utility Model Appln. N° 103874/67 filed Dec. 8, 1967--.

Additionally, the sole Japanese application presently appearing in the Claim should be corrected as follows:

--42/103873-- instead of "43/103873".

Signed and sealed this 27th day of June 1972.

(SEAL)
Attest:

EDWARD M. FLETCHER, JR.        ROBERT GOTTSCHALK
Attesting Officer               Commissioner of Patents